United States Patent [19]
Dhont et al.

[11] Patent Number: 5,397,237
[45] Date of Patent: Mar. 14, 1995

[54] APPARATUS FOR STIMULATING RESPIRATORY CONDITIONS ESPECIALLY PATHOLOGICAL RESPIRATORY CONDITIONS

[75] Inventors: Patrick Dhont; Pierre Roudot; Denis Refait, all of Paris, France

[73] Assignee: F.M.C. Production (société a responsabilité limitée), Boulogne, France

[21] Appl. No.: 164,034

[22] Filed: Dec. 8, 1993

[30] Foreign Application Priority Data

Feb. 18, 1992 [FR] France ............................ 92 01808

[51] Int. Cl.$^6$ ............................................ G09B 19/00
[52] U.S. Cl. ...................................... 434/262; 434/265
[58] Field of Search ......................... 434/262, 265–267, 434/270, 428, 219; 128/668; 364/413.01–413.04

[56] References Cited

U.S. PATENT DOCUMENTS 4,360,345 11/1982 Hon ................................. 434/265 X
4,797,104 1/1989 Laerdal et al. ...................... 434/265
4,915,635 4/1990 Ingenito et al. ................ 434/265 X

*Primary Examiner*—Richard J. Apley
*Assistant Examiner*—Glenn E. Richman
*Attorney, Agent, or Firm*—Bachman & LaPointe

[57] ABSTRACT

Apparatus for teaching respiratory auscultation semiology includes a manikin, a stethoscope simulator having a head and earpieces connected to a receiver and a control device connected to the manikin. The manikin has an envelope animated by a drive system and proximity sensors responsive to the head. The control device includes a control unit, a memory for groups of sound data associated with a respiratory condition connected to it to supply the data to it, and a transmitter connected to it to receive a sound data signal derived from this data. The control unit is connected to the manikin to receive signals from the sensors and, according to their source, to produce the sound data signal and a motor control signal derived from the sound data.

10 Claims, 3 Drawing Sheets

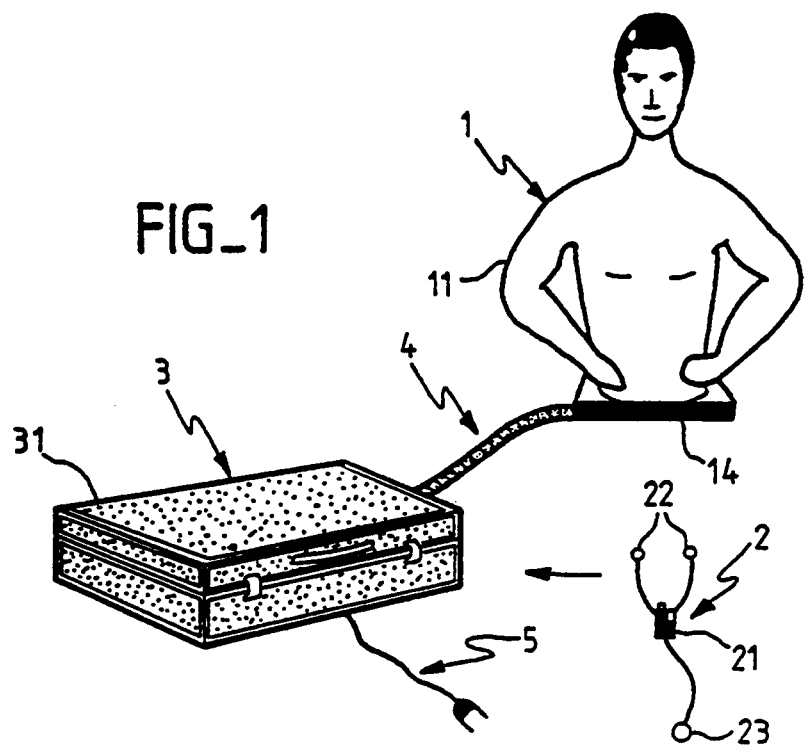
FIG_1
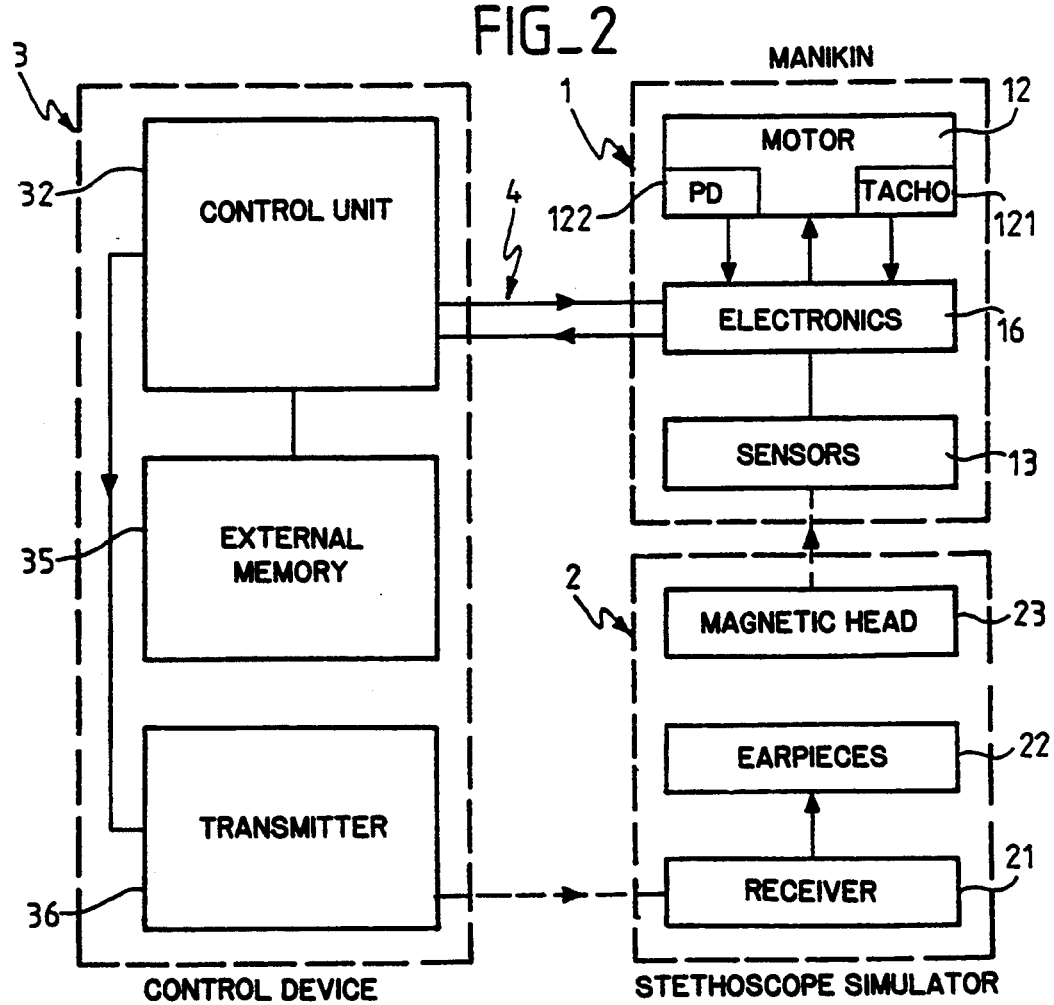
FIG_2

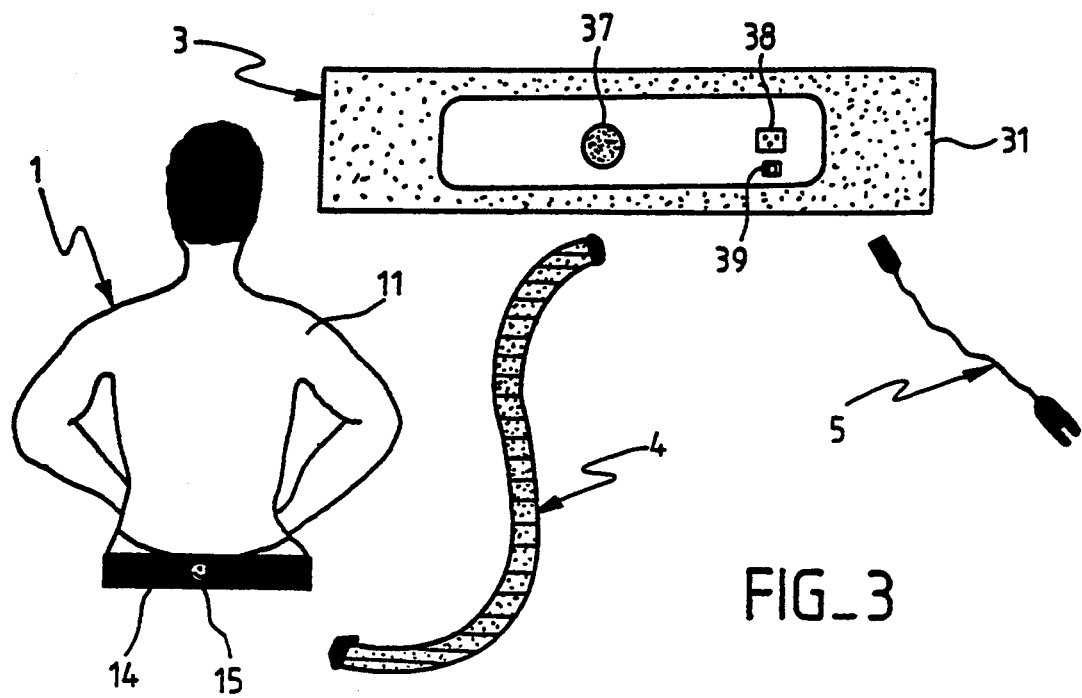
FIG_3
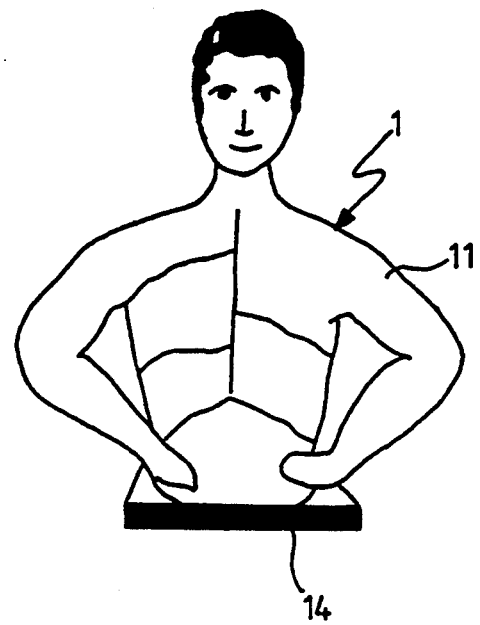
FIG_4a
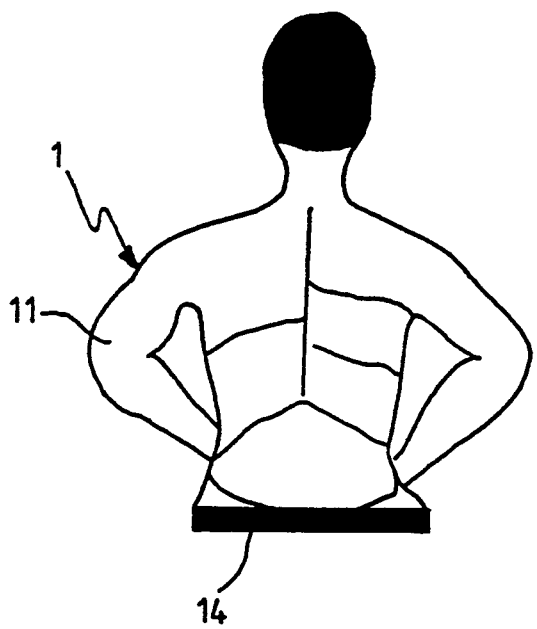
FIG_4b

FIG_5
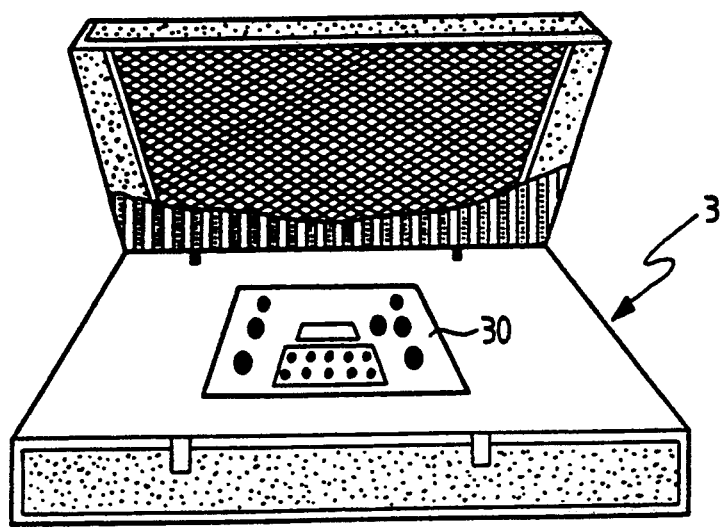
FIG_6
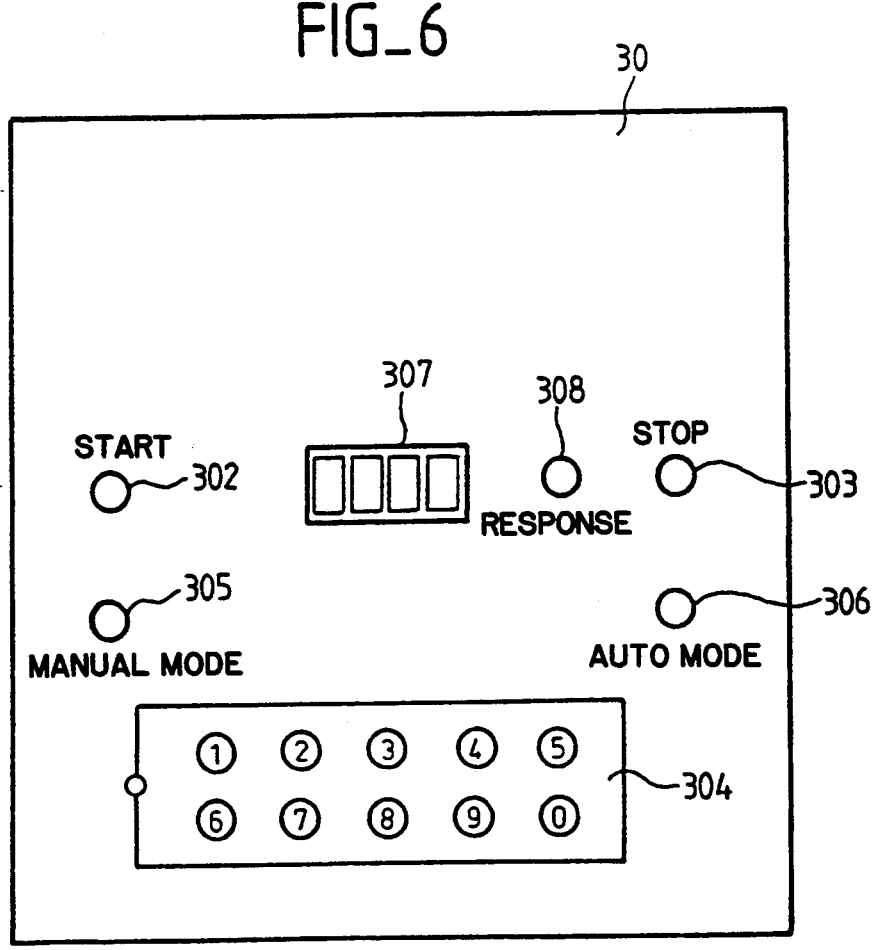

APPARATUS FOR STIMULATING RESPIRATORY CONDITIONS ESPECIALLY PATHOLOGICAL RESPIRATORY CONDITIONS

BACKGROUND OF THE INVENTION

1. Field of the invention

The invention concerns apparatus for simulating pathological and other respiratory conditions for teaching respiratory auscultation semiology to medical personnel.

2. Description of the prior art

Simulation devices for teaching medical personnel are known, especially devices for teaching anaesthesia and devices for teaching circulatory auscultation semiology. These devices are usually complex, heavy, bulky and therefore difficult to transport and costly. Also, there is no simple way of adapting them to collective use.

SUMMARY OF THE INVENTION

The invention consists in an apparatus for simulating pathological and other respiratory conditions comprising a manikin reproducing the external appearance of approximately the upper half of the body of a patient, a stethoscope simulator having at least one earpiece and a head connected to a device for receiving radiation conveying a signal, and at least one control device connected electrically to said manikin, in which apparatus said manikin has a flexible and elastical material envelope simulating the skin of the patient, at least one drive device for animating the manikin by moving at least one area of the flexible material envelope, and sensors disposed under said envelope to detect the proximity of said head, said head comprises at least one unit adapted to cooperate with said sensors so that at least said sensor nearest said head initiates transmission of a proximity signal to said control device, and said earpiece is an electroacoustic transducer connected electrically to said receiver device, said control device includes a control unit, at least one memory unit in which are stored groups of sound data each associated with a respiratory condition connected electrically to said control unit to supply to it, on the basis of instructions received, a corresponding group of sound data, and a transmitter of said signal-carrying radiation also connected electrically to said control unit to receive therefrom a sound data signal produced by it from the sound data group received by it, and said control unit is connected to said manikin to receive said proximity signal from it and, depending on its source, to generate the sound data signal sent to said transmitter and to deliver to said manikin a control signal for said drive device derived from said sound data.

The invention thus simulates the external physique of a patient by means of a manikin and simulates the behavior of the manikin by means of a control device comprising an electronic control system and peripheral devices controlled by this system, to be more precise simulation of the pulmonary areas by arrays of sensors, simulation of respiratory sounds by means of a stethoscope simulator and mechanical simulation of respiration by raising and lowering part of the manikin by means of a drive device.

Other objects, advantages and features of the invention will emerge from the following description of one embodiment of the apparatus in accordance with the invention given by way of non-limiting example with reference to the appended drawings.

BRIEF DESCRIPTION OF THE DRAWINGS

FIG. 1 is a diagram showing the external appearance of apparatus in accordance with the invention.

FIG. 2 shows a block diagram of the electronics of the apparatus in accordance with the invention.

FIG. 3 is a diagram showing the interconnection of the component parts of the apparatus from FIG. 1.

FIGS. 4A and 4B are diagrams showing the distribution of the pulmonary lobes of a patient and of the manikin of the apparatus from FIG. 1.

FIG. 5 shows the control device of the apparatus in accordance with the invention open.

FIG. 6 shows the control panel of the device from FIG. 5.

DETAILED DESCRIPTION OF THE INVENTION

The apparatus shown in FIG. 1 includes a manikin 1 part of which reproduces the exterior of approximately the upper half of a human body, supposedly that of a patient consulting a practitioner for the purposes of a pulmonary examination, a stethoscope simulator 2 and a control device 3. The control device is housed in a carrying case which is shown closed, i.e. in the non-functioning position; it is connected to the manikin by an electric cable 4 incorporating five conductors and is connected to the mains electrical power supply by a single power supply cord 5.

The manikin 1 includes a rigid structure to support (in the manner of the bones and muscles) an envelope 11 of a flexible and elastic material imitating the texture of the human skin (flesh-colored silicone reinforced, except at certain locations, by a layer of laminated resin); the realism is augmented by the use of silicone paint to simulate the eyes, the mouth, the nails, etc. and part of the hair (hair on the head, eyebrows) is simulated by means of false hair. Inside the torso of the manikin are one or more drive devices 12 for moving parts of the flexible material envelope which are rendered mobile by discontinuities in the reinforcing structure so that animation of these parts simulates movements due to respiration; here the drive devices 12 comprise a variable speed DC motor articulated to a pivoted link; the motor is coupled to a linkage including a link which it rotates and which is guided in its rotation on one of the laminated resin reinforcing shells of the manikin; the resulting oscillatory movement of the motor drives a ventral shell; the movement simulating the respiratory rhythm by means of oscillatory up and down movements of the abdomen of the manikin is synchronized with the sounds supposedly emitted by the supposedly auscultated pulmonary area in order to simulate the respiratory rhythm, without disturbing the diagnosis based on the respiratory sounds; to this end the motor is controlled by a control device incorporating two loops respectively responsive to a tachogenerator 121 rotating with the shaft of the motor and a position sensor 122. In the immediate vicinity of the inside surface of the flexible material envelope are removable plates of proximity sensors 13, for example flexible blade electromagnetic switches usually called reed relays. This part of the apparatus approximately representing the upper half of a human body is mounted on a base 14 fitted with at least one electrical connector 15 whose pins are connected to respective drive devices 12 to supply them with power and to the proximity sensors 13 to receive an indication of their status through the intermediary of an electric circuit board 16 carrying logic circuits which scan the sensors in order to transmit to the control device proximity signals corresponding to the sensors excited and optionally carrying part of the motor control device.

The stethoscope simulator 2, referred to as the "stethoscope" hereinafter, is in fact a receiver, a radio receiver, for example, comprising a receiver device 21 to which are electrically connected one or more (usually two) earpieces 22 implemented in a conventional technology (electroacoustic transducers); an auscultation head 23 is mechanically fastened to the apparatus 21 and is provided with a unit adapted to cooperate with the sensors 13, for example containing a bar or comprising a head 23 of ferromagnetic material, here a magnet, so that proximity of the head to the proximity sensors 13 causes at least the nearest of them to be excited (the switch to be closed in the case of reed relays, for example), resulting in the production of a proximity signal as mentioned above; the receiver device is powered by batteries which can be recharged via a power supply connector by a charger in the control device 3; a volume control potentiometer with integral switch turns the receiver device on and off and adjusts the volume.

The carrying case of the control device 3 is a compact (a few cubic decimeters) attaché case 31 containing a control unit 32 including an automatic controller and digital sound circuit board supporting and electrically connected to various components of the control unit, external EPROM memories 35 connected to and supported by the automatic controller and digital sound circuit board and an analog sound circuit board constituting a transmitter 36, in this example a radio transmitter also connected to the control unit, together with the necessary power supplies; the apparatus includes at least two connectors 37, 38: one for connecting the cable 4 and the pins of which are connected to the control unit to send it the proximity signals and to receive from it signals for actuating the drive devices of the manikin, and the other for the power supply cord 5, a power supply switch 39 being provided for connecting and disconnecting the power supply circuit of the apparatus. The components of the control unit carrying by the automatic control and digital sound circuit board and connected to it include an automatic control microcontroller managing the control unit, an internal EPROM memory divided into four tables and an analog sound microcontroller. The external memory units 35 with a total capacity of 80 Mbits are divided between four plug-in circuit boards on each of which are stored sampled sound data corresponding to 16 pulmonary conditions (smoker's or chronic bronchitis, etc., and possibly one or more healthy conditions); for each pathology a group of five sounds is stored sampled at a frequency in the order of 8 to 16 kHz, obtained by recording the actual pulmonary sounds "in vivo" by applying a real stethoscope to the five pulmonary lobes of a patient; each respiration sound corresponds to one or two inspiration-expiration cycles stored in a few tens of kilobytes of memory which are reproduced repetitively by looping the signal for the required period of time. The four tables of the internal EPROM memory are respectively provided to contain the order of the five sound memory areas of the selected pathology, for carrying out a duplicated sort and for managing conflicts according to the result of sensor scanning, for holding the value of the voltage representing the speed of the motor, and for holding the length of the sound loop to be applied according to the duration of the sounds recorded in the case of the selected pathology (defined as the number of steps to be effected by the memories before they are reset by a device provided for this purpose, as described later).

The input of the sort and conflict management table is connected to the output of sensor logic in turn connected to the manikin, while its output controls an area selector at the output of the sound memory and a stethoscope presence selector connected in cascade; the motor speed is slaved to a set point value read from the table, depending on the duration of the sound cycle; the table containing the length of the loop is also connected to the reset device, one output of which is connected to a reset input of a counter associated with a random pathology selector connected to the sound memory units 35. The internal memory is also connected to a keyboard for selecting conditions to be simulated. The output of the sound memory units 35 is connected via the area selector and the stethoscope presence selector to the analog sound microcontroller which includes byte request logic and a digital/analog converter; the output of the byte request logic is connected to a counter increment input and the output of the converter is connected to the input of the analog sound circuit board 36; the output of a silence generator is also connected to the input of the analog sound microcontroller via the stethoscope presence selector. A connector connected to the control unit 32 connects the EEPROM for storing data in the tables of the internal memory, namely data on the correspondence of the areas, the speed of the motor and the length of the loop. The analog sound circuit board constituting the transmitter 36 is connected to the control unit, to be more precise to the output of the digital/analog converter, to receive from it an analog sound data signal produced by it from the sound data group it receives from the memory unit 35 on the basis of instructions also produced by it according to the source of the proximity signals; this transmitter has a low-pass filter at its input, in this example a fifth order filter, for smoothing the signal and for cutting off frequencies greater than half the sampling frequency, the output analog sound data signal of which drives a radio frequency stage in order to modulate the radio frequency carrier followed by a telescopic or concealed transmit antenna; this signal also drives circuitry connected to respective output circuits for an infra-red transmitter, conventional headphones and an oscilloscope.

The approximately life-size half-figure (head, torso, arms) is disposed vertically on its base 14 and the arms are bent so that the hands are attached to the hips to give access to the areas to be auscultated, especially in the area of the armpits. The torso of the manikin is subdivided at the front and at the back into five areas substantially corresponding to the two left lobes and to the three right lobes of the left and right human lungs, respectively, which are fairly clearly differentiated in terms of the respiratory sounds produced. The sensors 13 are divided between four plates (two at the front, on the left and right, respectively, and two at the back on the left and right, respectively), the two plates on the left simulating the left lung being each divided into two areas and the two righthand plates simulating the right lung being each divided into three areas. The plates in which the reed relays are mounted are composite structures comprising a layer of laminated resin and a layer of foam; the reed relays in each area are connected in parallel; the ten areas are each connected to an optocoupler/trigger device to which a high excursion resistor is connected.

The function of the control device 3, and more particularly that of the control unit 32, is to produce electrical signals for imitating as faithfully as possible the sounds of respiration and the movements of the abdomen when they are respectively applied to the transmitter 36 and to the drive devices 12 which animate the manikin 1, and this for all conditions (whether constituting clinical syndromes or not) for which sound data is stored in the memory 35, the sounds and movements in question being varied to suit the condition simulated and the location which is auscultated.

Because the manikin 1 incorporates plates of sensors 13 divided into areas whose locations respectively correspond to the five lobes of the lung and because the sound data signals produced by the control unit are different according to their source, for each condition there are different auscultation sounds, depending on the sensor(s) excited; it is naturally better to use a large number of sensors so that applying the head 23 to any location on the thorax, whether at the front, back or side, causes the production of sound data signals and operation of the drive devices; in this example there are 350 sensors in all and, as already explained, these sensors 13 are advantageously grouped into five pairs of sensor areas disposed in a network, each pair of areas representing one of the pulmonary lobes, enabling the nearest position of the head to be determined accurately.

The double-loop control device mentioned earlier enables the drive motor to "track" the inspiration and expiration cycle as follows: each pathology is associated with a speed such that the motor completes a rotation in a time which is slightly less than that of an inspiration-expiration cycle; the motor must then stop briefly and then restart in synchronism with the sound; to this end the initial speed is prerecorded in a table. This control device comprises a comparator which compares the "sound time" corresponding to the duration of one period of the sound phenomena of the inspiration-expiration cycle of the selected pathology (set point) and the "motor time" measured by the position sensor, in order to retain the short stop mentioned above; if the "motor time" becomes longer than the "sound time", the control device stops the motor until the end of the current inspiration-expiration cycle and restarts it at a higher speed, which closes one of the control loops; the output of the tachogenerator is connected to an input of the control device, which closes the other loop. The electronic circuit board carrying this control device requires a power supply at between +12 V and +30 V and is controlled by a voltage of up to a few volts.

The device 3 includes a control panel 30 with simulation start and stop buttons 302, 303, the numerical keypad 304 for selecting the condition to be simulated and comprising ten keys numbered from 0 through 9 for entering the number to call up the selected condition to be reproduced by the manikin, and operating mode selector pushbuttons 305, 306 enabling use of the keypad to call up the selected condition or the control device (more accurately the control unit) to select a condition at random from the library of selectable conditions for self-assessment of the knowledge of the user.

A numerical display 307 connected directly to the data bus shows the number of the selected pulmonary condition on pressing a "view" pushbutton 308. The pushbuttons and the keypad keys are light-emitting devices and those turned on at any given time are the only valid pushbuttons and keys and represent a request for information at this time. The pushbuttons, the keypad and the display are electrically connected to and carried by the automatic controller and digital sound circuit board.

The connector for connecting a conventional infra-red transmitter enables the use of conventional infra-red headphones worn by the members of a possibly large audience so that all of the audience can simultaneously hear the respiratory sounds corresponding to the selected condition. The carrying case may advantageously also incorporate a further connector for synchronizing the apparatus with audiovisual equipment such as a slide projector.

The carrying case also incorporates a compartment for stowing the radio transmitter.

To use the apparatus, with the manikin 1 connected to the control device 3 in turn connected to the mains electrical power supply one of the operating mode selector pushbuttons 305, 306 is pressed to select either manual operation (with selection of conditions by means of the numerical keypad 304) or random operation under the control of the control unit. When manual or automatic operation has been selected, the simulation of the selected pulmonary condition is "run" by pressing the start pushbutton 302 which automatically displays the number of this pulmonary condition if manual operation was selected, generates the sound data signals, simulates the respiratory movements and optionally displays the number of the pulmonary condition selected by the control unit when the "view" pushbutton 308 is pressed if the random operating mode was selected. If the head 23 of the stethoscope simulator 2 is applied to any of the ten sensor areas, transmission of the radio frequency carrier modulated by the sound data signal corresponding to the selected pulmonary lobe and demodulation by the receiver causes the sound associated with the selected pulmonary condition to be heard immediately in the earpieces, this continuing until the head is moved away from the manikin, possibly to be applied to another area, or until the pushbutton 303 is operated to halt the simulation, possibly to select a different condition. In the case of a large audience, an infra-red transmitter is connected to the appropriate connector on the control device and its output is modulated by the smoothed analog data signal from the low-pass filter so that each person wearing an infra-red headset can hear the same sound associated with the selected condition.

When the manual control pushbutton 305 and the selection keypad 304 or the automatic control pushbutton 06 are operated the number of the pulmonary condition selected by means of the keypad or selected at random is sent to the automatic control microcontroller. Three of the four tables in the internal memory are then consulted to obtain data appropriate to this number in order to set up the appropriate loop, the counter being constantly incremented by read requests from the analog sound microcontroller; the counter in turn increments the sound memory unit and this process continues in respect of data of the group corresponding to the selected pathology and the incrementing of the counters; when the number of steps stored in the table of the internal memory containing the length of the loop is reached, the counter is reset by the reset circuit; still incremented by the analog sound microcontroller, the counter resumes consultation of the sound memory unit from the beginning and starts a new loop, and this process continues. Immediately the user presses the start pushbutton 302 the motor speed is slaved to the sound loop, as already explained, and if appropriate the sounds transmitted by the radio frequency transmitter are slaved to the areas auscultated; as already mentioned, means are provided for managing any conflicts that may arise in this respect: if no sensor indicates auscultation the conflict management table, via the stethoscope presence selector, switches the silence generator to the analog sound microcontroller and no sound is heard in the stethoscope; on the other hand, if one or more areas are auscultated it acts to ensure that only one area is activated, associates this area through the area selector with the data of the data group associated with the stored pulmonary condition relative to this area and (by means of the stethoscope presence selector and the area selector) routes this data to the analog sound microcontroller. The analog sound microcontroller receives two signals coded on four bits via the data bus; it uses an internal algorithm to transpose each of these two signals onto ten bits and then converts the digital signal coded on ten bits into a "staircase" analog signal; the low-pass filter smooths this signal and cuts off frequencies above half the sampling frequency; the resulting analog sound data signal is applied to the transmitter and detecting in the stethoscope.

Note that the selection of a pulmonary condition is associated with the reading of five memory locations in a loop and the determination of the length of the loop and the speed of the motor, but that it is only operation of the start pushbutton which initiates slaving of the sounds of the areas auscultated on the manikin and slaving of the motor speed (determined by a motor timebase) to the timing of the "sound loops" (sound timebase).

Of course, the invention is not limited to the embodiment described above and shown in the drawings, which may be varied without departing from the scope of the invention.

There is claimed:

1. Apparatus for simulating pathological and other respiratory conditions comprising a manikin reproducing the external appearance of approximately the upper half of the body of a patient, a stethoscope simulator having at least one earpiece and a head connected to a device for receiving radiation conveying a signal, and at least one control device connected electrically to said manikin, in which said manikin has a flexible and elastic material envelope simulating the skin of the patient, at least one drive device for animating the manikin by moving at least one area of the flexible material envelope, and sensors disposed under said envelope to detect the proximity of said head, said head comprises at least one unit adapted to cooperate with said sensors so that at least said sensor nearest said head initiates transmission of a proximity signal to said control device, and said earpiece is an electroacoustic transducer connected electrically to said receiver device, said control device includes a control unit, at least one memory unit in which are stored groups of sound data each associated with a respiratory condition connected electrically to said control unit to supply to it, on the basis of instructions received, a corresponding group of sound data, and a transmitter of said signal-carrying radiation also connected electrically to said control unit to receive therefrom a sound data signal produced by it from the sound data group received by it, and said control unit is connected to said manikin to receive said proximity signal from it and, depending on its source, to generate the sound data signal sent to said transmitter and to deliver to said manikin a control signal for said drive device derived from said sound data.

2. Apparatus according to claim 1 wherein said transmitter and said receiver are a radio frequency transmitter and receiver.

3. Apparatus according to claim 1 wherein said head and said sensors constitute an electromagnetic sensing system.

4. Apparatus according to claim 1 wherein said sensors of said manikin are grouped in ten areas.

5. Apparatus according to claim 1 wherein said control device includes a connector receiving a sound data signal and adapted to be connected to an infra-red transmitter.

6. Apparatus according to claim 1 wherein said control device includes a connector receiving synchronization data and adapted to be connected to an audiovisual device.

7. Apparatus according to claim 1 comprising operating mode control means and manual pulmonary condition selector means.

8. Apparatus according to claim 1 further comprising operating mode control means and random pulmonary condition selector means.

9. Apparatus according to claim 1 comprising diagnosis display means.

10. Apparatus according to claim 1 wherein said control device includes, connected in cascade to the output of said memory unit, an area selector and a stethoscope presence selector controlled by an internal memory, the output of said stethoscope presence selector being connected to said transmitter by means of an analog sound microcontroller including a digital/analog converter.

* * * * *

UNITED STATES PATENT AND TRADEMARK OFFICE
CERTIFICATE OF CORRECTION

PATENT NO. : 5,397,237
DATED : MARCH 14, 1995
INVENTOR(S) : PATRICK DHONT ET AL.

It is certified that error appears in the above-identified patent and that said Letters Patent is hereby corrected as shown below:

On the Cover Page the Assignee should read
--F.M.C. PRODUCTION and ANIMACTOR--.

Signed and Sealed this

Seventh Day of May, 1996

Attest:

BRUCE LEHMAN

Attesting Officer

Commissioner of Patents and Trademarks